(12) United States Patent
Rossi

(10) Patent No.: US 8,990,232 B2
(45) Date of Patent: Mar. 24, 2015

(54) APPARATUS AND METHOD FOR PARALLEL REGULAR EXPRESSION MATCHING

(75) Inventor: Frederic Rossi, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/472,318

(22) Filed: May 15, 2012

(65) Prior Publication Data

US 2013/0311495 A1 Nov. 21, 2013

(51) Int. Cl.
*G06F 17/30* (2006.01)
*H04L 29/06* (2006.01)

(52) U.S. Cl.
CPC .... *G06F 17/30495* (2013.01); *G06F 17/30864* (2013.01); *H04L 63/0245* (2013.01)
USPC ............................ 707/758; 707/737; 709/223

(58) Field of Classification Search
CPC . G06F 17/30495; G06F 9/444; G06F 15/177; G06F 21/00; G06F 21/552; H04L 63/0245; H04L 63/0254; H04L 63/101; H04L 63/1408; H04L 63/1416; H04L 63/145; H04L 43/026; H04L 63/0263; H04L 63/0227; H04L 67/1097
USPC ................................... 707/758, 737; 709/223
See application file for complete search history.

(56) References Cited

U.S. PATENT DOCUMENTS

| | | | |
|---|---|---|---|
| 6,272,495 B1 * | 8/2001 | Hetherington | 1/1 |
| 6,601,058 B2 * | 7/2003 | Forster et al. | 707/716 |
| 7,225,188 B1 * | 5/2007 | Gai et al. | 707/669 |
| 7,539,031 B2 * | 5/2009 | Ninan et al. | 365/49.1 |
| 7,899,904 B2 * | 3/2011 | Ruehle | 709/224 |
| 7,962,458 B2 * | 6/2011 | Holenstein et al. | 707/704 |
| 8,347,384 B1 * | 1/2013 | Preston | 726/23 |
| 2003/0051043 A1 * | 3/2003 | Wyschogrod et al. | 709/230 |
| 2003/0065800 A1 * | 4/2003 | Wyschogrod et al. | 709/230 |
| 2004/0162826 A1 * | 8/2004 | Wyschogrod et al. | 707/6 |
| 2005/0012521 A1 * | 1/2005 | Sharangpani et al. | 326/46 |
| 2005/0273450 A1 * | 12/2005 | McMillen et al. | 707/716 |
| 2008/0270764 A1 * | 10/2008 | McMillen et al. | 712/220 |
| 2008/0271141 A1 * | 10/2008 | Goldman et al. | 726/22 |
| 2011/0153630 A1 * | 6/2011 | Vernon et al. | 707/758 |
| 2012/0072380 A1 * | 3/2012 | Liu et al. | 706/12 |
| 2012/0290736 A1 * | 11/2012 | McMillen | 709/231 |

* cited by examiner

*Primary Examiner* — Shahid Alam
*Assistant Examiner* — Nargis Sultana
(74) *Attorney, Agent, or Firm* — Coats & Bennett, PLLC

(57) ABSTRACT

A regular expression matching hardware implementation comprises two tightly coupled hardware engines. A regex engine performs state transitions and accepts (as matching) or rejects (as not matching) an input string. The regex engine takes also care of the logic of the operators and deals with the complexity of the state machine. A lookup engine reads characters from an input (e.g., tape, memory, network packets, or the like), and provides them to the regex engine. A preprocessing procedure transforms a regular expression into a regex state transition table and a lookup table, for use by the regex engine and lookup engine, respectively. The two hardware engines are synchronized by a global state machine. The regex engine advances the state machine, and the lookup engine reads it.

13 Claims, 4 Drawing Sheets

APPARATUS AND METHOD FOR PARALLEL REGULAR EXPRESSION MATCHING

FIELD OF INVENTION

The present invention relates generally to computational hardware, and in particular to an apparatus and method for multiple, parallel, regular expression evaluation and matching.

BACKGROUND

Digital data communication networks (i.e., packet-switched networks) are ubiquitous, and continue to increase in size and speed. For a variety of reasons, including load balancing, security, and the like, deep packet inspection (DPI) is necessary. DPI involves searching not only packet headers, but the payloads of packets, for known data patterns (e.g., "fingerprints" or signatures of known malware, such as viruses). Due to the increasing speed of network communications, and the need to inspect a large portion of, if not all, data packets, software-based DPI is not efficient enough to satisfy the bandwidth requirements. Furthermore, due to the variety and complexity of DPI-targeted data, conventional alphanumeric string comparison is insufficient.

Regular expressions (regex), popularized in UNIX utilities (e.g., ed, grep) and scripting programming languages (e.g., AWK, Perl), provide a powerful, compact, and very flexible means to match strings of text, including particular characters, words, or patterns of characters. For example, a regex engine would match the regular expression "log" to all of: log, bologna, logarithm, and analog. Regular expressions may include logical operators (i.e., OR), wildcards, repetition specifiers, and the like. The syntax of regular expressions is well known, and documented in numerous texts in the computing arts. See, e.g., Hoperoft, et al., *Introduction to Automata Theory, Languages, and Computation*, Addison-Wesley; Michael Sipser, *Introduction to the Theory of Computation*, Chapter 1: Regular Languages, PWS Publishing (ISBN 0-534-94728-X); Tony Stubblebine, *Regular Expression Pocket Reference* (2003), O'Reilly (ISBN 0-596-00415-X); Goyvaerts, et al., *Regular Expressions Cookbook* (2009), O'Reilly (ISBN 9778-0596520687).

An architecture for implementing a regex engine in hardware, that is able to perform DPI at wire speeds, for multiple expressions in parallel, while making efficient use of resources such as memory bandwidth, stands as a challenge of modern digital data communication networks.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, a regular expression matching hardware implementation comprises two tightly coupled hardware engines. A regex engine performs state transitions and accepts (as matching) or rejects (as not matching) an input string. The regex engine takes also care of the logic of the operators and deals with the complexity of the state machine. A lookup engine reads characters from an input method (e.g., tape, memory, network packets, or the like) as many bytes as needed, and provides them to the regex engine. A preprocessing procedure transforms a regular expression into a regex state transition table and a lookup table, for use by the regex engine and lookup engine, respectively. The two hardware engines are synchronized by a global state machine. The regex engine advances the state machine, and the lookup engine reads it.

One embodiment relates to a method of matching a stream of characters against a predetermined regular expression. A transition table, representing the regular expression as a graph comprising one or more input-conditional state transition specifications, is obtained. A lookup table is generated based on the transition table. The lookup table specifies a number of characters to obtain from a character stream at each state of a state machine. A state machine is initialized. A lookup engine is executed. The lookup engine is operative to, at each state of the state machine, retrieve the number of characters specified in the lookup table for that state, and provide the characters to a regex engine. A regex engine is also executed. The regex engine is operate to, at each state of the state machine, perform one of two functions: calculating a next state of the state machine based on the current state, any characters received from the lookup engine, and the graph of state transition specifications; and terminating the method if characters received from the lookup engine fail to match input conditions for all active state transition specifications or if a match succeeds.

Another embodiment relates to a regular expression matching apparatus. The apparatus includes an input operative to provide characters to be matched to a regular expression. The apparatus also includes memory operative to store a first lookup table specifying a number of characters to retrieve from the input at each state of a first state machine, and further operative to store a first transition table representing a first regular expression as a graph comprising a plurality of input-conditional state transition specifications for the first state machine. The apparatus further includes a lookup engine operative to, at each step of the first state machine, retrieve the number of characters specified in the first lookup table from the input and provide the characters to a first regex engine. The apparatus additional includes a first regex engine operative to, at each state of the first state machine, perform one of the following functions: calculate a next state of the first state machine based on its current state, any characters received from the lookup engine, and the graph of input-conditional state transition specifications; and terminate the matching process if characters received from the lookup engine fail to match input conditions for all active state transition specifications or if a match succeeds.

DETAILED DESCRIPTION

According to one embodiment of the present invention, high-speed regular expression matching—sufficient to perform deep packet inspection in real time in a communication network environment—is performed with a hardware apparatus. The apparatus includes a regular expression, or regex, engine and a lookup engine. These two engines are tightly coupled, and synchronized by a global state machine (which is updated by the regex engine). In general, the regex engine controls state transitions of the state machine, and accepts or rejects an input comprising one or more characters as matching (or not) a regular expression. The lookup engine reads the proper number of characters from an input (which may comprise tape, memory, network packets, or the like) and provides them to the regex engine for processing.

Figure 1:
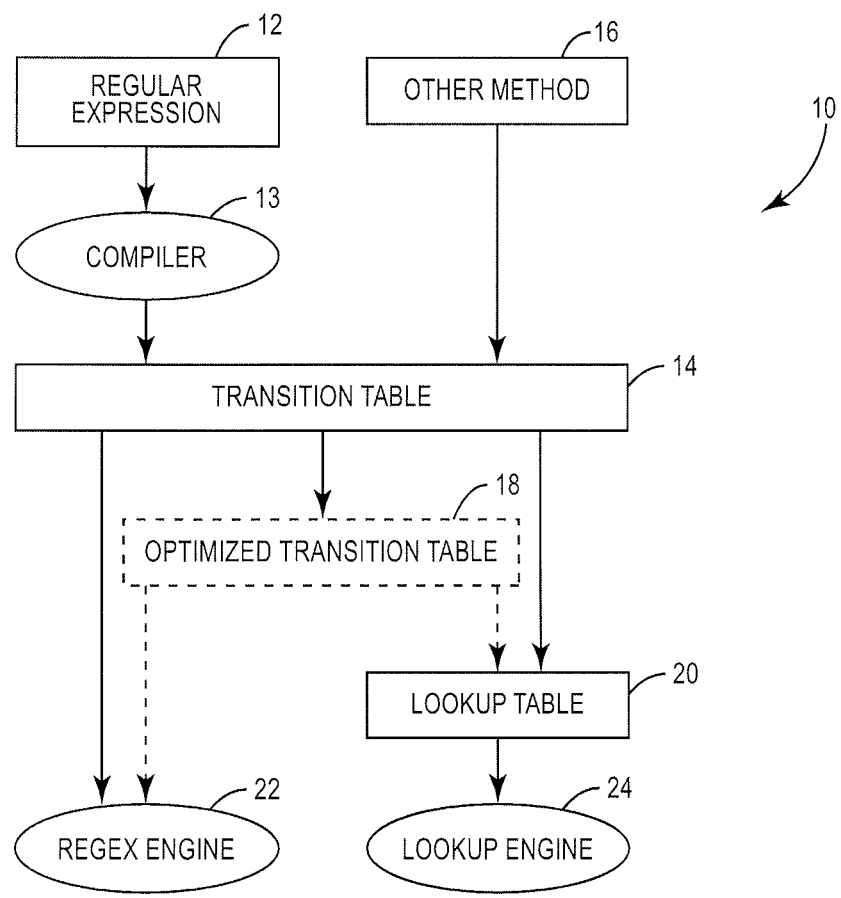
FIG. 1 is a flow diagram of an overall process of regular expression matching.

FIG. 1 depicts an overall view of the method of regular expression matching by the apparatus. A predetermined regular expression 12 is converted to a transition table 14. The transition table 14 includes a graph comprising a plurality of input-conditional state transitions. That is, as further described herein, the graph is a series of specifications that define transitions from a current state of the global state machine to a new state. Some of these state transition specifications may be conditional upon the input received by the regex engine from the lookup engine. The transition table 14 may be compiled from the regular expression 12, e.g., by a software program that recognizes the syntax of the regular expression 12 and generates a graph of input-conditional state transitions that implement it. Alternately, the transition table 14 may be obtained by other means 16. For example, transition tables 14 corresponding to widely used regular expressions 12 may be generated remotely and provisioned in, or transmitted to, the regular expression matching apparatus.

The transition table 14 may optionally be optimized, generating an optimized transition table 18. These optimizations, described in detail herein, may improve operating speed and/or efficiency of the regex engine. A lookup table 20 is generated from the transition table 14 or optimized transition table 18 (both referred to herein as simply the transition table 14, 18). The lookup table 20 includes a plurality of state machine states, and specifies the number of characters that should be read from an input at each state. In operation, the regex engine 22 accesses the transition table 14, 18 to obtain the input-conditional state transitions applicable to the current state. The lookup engine 24 accesses the lookup table 20 to obtain the number of characters to read from the input for the current state. The lookup engine 24 provides the characters to the regex engine 22, which calculates the next state (based on the current state and the characters), or terminates the matching process if it either completes successfully or fails.

Figure 2:
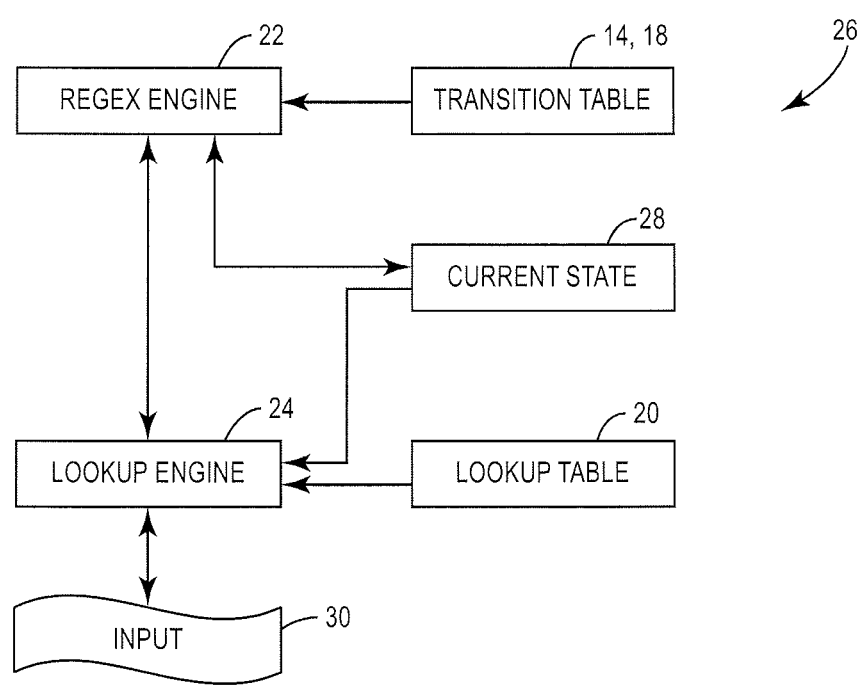
FIG. 2 is a functional block diagram of a regular expression matching apparatus.

FIG. 2 depicts a high level view of the hardware architecture of the regular expression matching apparatus 26. As described above, a regex engine 22 receives input character matching and state transition information from a transition table 14, 18. A lookup engine 24 receives input size information from a lookup table 20. Both the regex engine 22 and the lookup engine 24 read the current state of the state machine 28, and the regex engine 22 updates the state machine 28. The lookup engine 24 reads an appropriate number of characters from an input 30, and provides them to the regex engine 22.

In particular, the lookup engine 24 reads n characters from the input 30—referred to herein as a token—and provides this token to the regex engine 22. The lookup engine 24 gets the value of n from the lookup table 20, based on the current state 28. While reading n characters may comprise reading n bytes, this depends on the character encoding scheme used to represent characters in the input 30. In a preferred embodiment, the lookup engine 24 is able to read n characters at once from the input 30; however, in other embodiments, the lookup engine 24 repeatedly reads one or more characters from the input 30 until it has assembled the n characters specified by the lookup table 20. The lookup engine 24 maintains its current position in the input 30 as a starting point for the next lookup.

The lookup engine 24 transfers the n character token to the regex engine 22, such as by storing the characters in a memory location accessed by the regex engine 22. The size of the token does not need to be indicated, since the match will fail if the regex engine 22 does not receive input that matches an input-conditional state transition specification.

Figure 3:
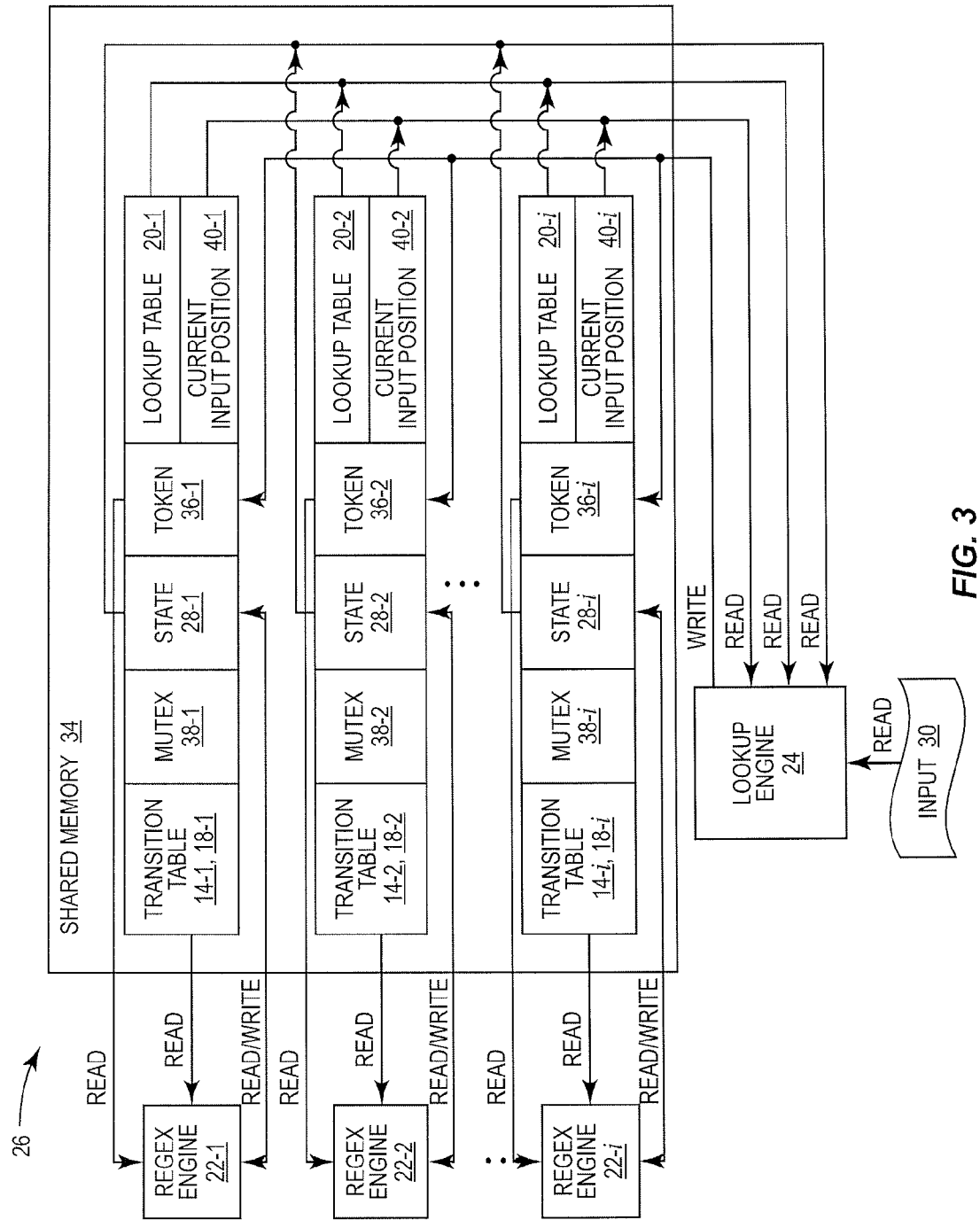
FIG. 3 is a block diagram of an apparatus operative to match multiple regular expressions.

FIG. 3 depicts an apparatus 32 in which multiple regex engines 22, each matching a different regular expression, are coupled to one lookup engine 24, retrieving characters from a single input 30. A shared memory 34 holds a plurality of transition tables 14, 18 and lookup tables 20, each associated with a different regex engine 22. Also maintained in memory associated with each regex engine 22 are the current state 28 of a state machine, space for passing a token 36, a mutual exclusion (mutex) memory location 38, and a current position 40 referencing the input 30. In some embodiments, the current position 40 associated with each regex engine 22 may alternatively be maintained by the lookup engine 24 as a pointer in a buffer, in a Direct Memory Access (DMA) engine, or the like, depending on implementation.

Because multiple regex engines 22 interact with a single lookup engine 24 (which accesses a single input resource 30), a mutex mechanism is necessary to ensure mutual exclusivity among the regex engines 22. Mutex mechanisms are well known in the computing and computer science arts, including both hardware and software solutions. As one representative example, the mutex mechanism may comprise a semaphore, wherein the lookup engine 24 writes a predetermined pattern (e.g., sets a bit) in the mutex memory location 38-$i$ for a selected regex engine 22-$i$, enabling the selected regex engine 22-$i$ to perform its matching operation. The lookup engine 24 writes a different pattern (e.g., clears the bits) to all other mutex memory locations 38. Each regex engine 22 polls its mutex location 38 until it discovers it has been selected. Of course, other mutex mechanisms are known in the art, including interrupts, arbitration, sideband signals, atomic memory operations, and the like. In general, any mutex mechanism may be used, so long as it allows only one regex engine 22 at a time to communicate with the lookup engine 24 (i.e., receive a token 36 and update its current state 28).

The lookup engine 24 schedules servicing each of the active regex engines 22 (that is, the regex engines 22 that are in the process of a regular expression matching operation) according to a predetermined arbitration scheme. For example, the lookup engine 24 may service each regex engine 22 in round-robin order, according to a fixed or variable priority, at random, or by any other arbitration scheme.

A simplified algorithm for operation of the lookup engine 24 follows:
- select an active regex engine 22-$i$ to service;
- get mutex 38-$i$ (i.e., set the mutex to exclude all non-selected regex engines 22);
- if at the beginning of a regular expression matching operation, set the current state 28-$i$ to the initial state; otherwise, read the current state 28-$i$;
- get, from the lookup table 20-$i$, the number n of characters to retrieve from the input 30;
- if n>0, read n characters from the input 30 (at once or sequentially) starting at the current position 40-$i$.

write the value of token 36-*i* (if any) in the shared memory 34 (in some embodiments, this may comprise passing the token 36-*i* to the regex engine 22-*i* in some other manner).

release mutex 38-*i* repeat (next active regex engine 22-*i*).

A simplified algorithm for operation of a regex engine 22-*i*, when invoked by the lookup engine 24, follows:

get mutex 38-*i* (in some embodiments, the regex engine 22-*i* has been polling the mutex location 38-*i* while dormant).

read transition table 14-*i*, 18-*i*, current state 28-*i*, and token 38-*i*;

calculate the next state of the state machine by applying the input-conditional state transition specification(s) for the current state to the token 38-*i*. If the token fails to match all active state transition specifications, the regular expression matching operation fails. If the state transition specification for the current state 28-*i* is "accept," the regular expression matching operation completes successfully.

If a next state is calculated, advance the state machine by writing the next state to the current state location 28-*i* for use in the next lookup;

release mutex 38-*i*.

As described above, a transition table 14, 18 includes a graph of input-conditional state transition specifications derived from a regular expression. In one embodiment, the conventional syntax of regular expressions is extended using special symbols to specify that sub-expressions should be evaluated sequentially (backtracking) or in parallel. The symbols <expr0|expr1| ... |exprn> indicate that the state machine maintained by the regex engine 22 should fork, and process the input (token received from the lookup engine 24) in parallel on all sub-expressions. The symbols {expr0|expr1| ... |exprn} indicate that the input should be matched with the sub-expressions sequentially. The latter is referred to herein as "backtracking."

For example, using this expanded syntax, the regular expression a<b|c|d> would match character strings ab, ac and ad. The symbols < > means that the input data is to be matched in parallel against the three strings. The regular expression a{b|c|d} performs the same match; however, the symbols { } mean that the input data is to be matched sequentially against the three strings, i.e., one after the other. One purpose of these symbols is to allow a decision to be made whether, considering the complexity of the included sub-expressions, parallel or serial evaluation would be more efficient in a given implementation.

The graph of input-conditional state transition specifications conforms to the following syntax:

[current state]
{token|keyword}→next state

That is, a current state is specified. In any execution iteration, only the input-conditional state transition specification associated with the current state is evaluated. The state transition specification may specify a token (input received from the lookup engine 24). If the token actually received exactly matches that in the input-conditional state transition specification (e.g., in both number and value of the characters), the regex engine 22 updates the state machine to the specified next state. If the received token does not exactly match that in the input-conditional state transition specification, the state transition fails. If no active state transition specification is satisfied, the entire regex matching process fails and the procedure terminates—that is, the character string failed to match the regular expression. Instead of a token, the input-conditional state transition specification may include a keyword. The keywords, defined below, provide flow control for state machine transitions.

:init: This keyword indicates that the current state is the initial state of the state machine. There can be only one :init: keyword per graph. The initial state may be, but is not required to be, 0.

:accept: This keyword indicates that the current state is a final state and that it accepts the input string as having matched the regular expression. The regex engine 22 stops processing. There can be as many :accept: keywords in a graph as necessary. This keyword is added for each ending that can indicate a successful regular expression match.

:any: This keyword indicates that the current state has a transition to one state in the graph. This is a stall state; i.e., the current token is not read. The :any: keyword may also be considered an unconditional branch instruction having a single branch target. One non-exclusive use for the :any: keyword is as a transition heading to the start of a block such as ( ), < > or { } or for the construct of a Kleene closure (i.e., "zero or more").

:branch: This keyword indicates that the current state has a parallel transition to a plurality of states in the graph. The :branch: keyword may thus be considered an unconditional branch instruction having two or more immediate branch targets. The current token is not read. The next state after the sub-expression block, if it is fully parsed to this point and not rejected, is referred to as the exit state.

:backtrack: This keyword indicates that the current state has a sequential transition to several states in the graph. The :backtrack: keyword may thus be considered an unconditional branch instruction having two or more sequential branch targets. The current token is not read. The next state after the sub-expression block, if it is fully parsed to this point and not rejected, is referred to as the exit state.

The following examples will illustrate the construction of a graph of input-conditional state transition specifications for some simple regular expressions (RE):

Example 1

RE="a"

[1]
  :init:
  a→2
[2]
  :accept:

Example 1 is simply a regex for a single occurrence of the character "a". Execution begins with state 1 being the initial state. During the first processing iteration, if the token retrieved by the lookup engine 24 is the single character "a", the regex engine 22 sets the next state to state 2. If the token is anything else, the matching process terminates. During the second processing iteration, the current state is 2. No token is read, and the regex engine 22 executes the :accept: keyword, terminating the matching process as being successful. As explained further herein, the lookup table 20 specifying the token size is derived from this graph. In this case, in state [1] the lookup engine 24 must retrieve a single character from the input 30. In state [2], no character is retrieved from the input 30.

Example 2

RE="(a)"
   a→3
[1]
   :init:
   :any:→2
[3]
   :accept:

In Example 2, the sub-expression grouping operator ( ) prompted the inclusion of an additional state transition by the :any: keyword.

Example 3

RE="abc"
[1]
   :init:
   a→2
[2]
   b→3
[3]
   c→4
[4]
   :accept:

Example 3 matches the sequential character string "abc", in that order. Note that three states are traversed, in each of which the lookup engine 24 retrieves a single character token.

Example 4

RE="a+"
[1]
   :init:
   a→2
[2]
   :branch:→1, 3
[3]
   :accept:

Example 4 specifies a search for at least one occurrence of the character "a", and any repeat thereof. State 1 matches the first "a". The :branch: keyword in state [2] forks the state machine to two new states simultaneously—states 1 and 3. State 3 accepts, since at least one character "a" matched. State 1 attempts to match a repeat occurrence of the character "a".

Example 5

RE="a*"
[1]
   :init:
   :any:→2
[2]
   :branch:→3, 4
[3]
   a→2
[4]
   :accept:

Example 5 is an example of a Kleene closure specification—the regex is to match "zero or more" occurrences of the character "a". The init state 1 causes an unconditional branch to state 2, which specifies a parallel branch to states 3 and 4. State 4 accepts, fulfilling the "zero" part of the regex specification. State 3 matches the character "a", then transitions back to the branch in state 2, to both accept for having matched a single "a", and to search for additional occurrences thereof.

Example 6

RE="(a)*"
[2]
   a→3
[1]
   :init:
   :any:→3
[3]
   :any:→4
[4]
   :branch:→5, 6
[5]
   :any:→2
[6]
   :accept:

Example 6 is similar to Example 5, but with the character "a" grouped as a sub-expression by the ( ) symbols. This causes the inclusion of :any: keywords at states 3 and 5.

Example 7

RE="(a)+"
[2]
   a→3
[1]
   :init:
   :any:→2
[3]
   :any:→4
[4]
   :branch:→2, 5
[5]
   :accept:

Example 7 matches all repetitions of the sub-expression by the symbols ( ), which sub-expression comprises the character "a". Control first passes to state 2, which must match the character "a" at least once. If this occurs, control goes to state 3, then 4, where it branches to state 5 to accept, and additionally branches to state 2 to test additional occurrences of the character "a".

Example 8

RE="<a|b>"
[4]
   b→5
[3]
   a→5
[1]
   :init:
   :any:→2
[2]
   :branch:→3, 4
[5]
   :accept:

Example 8 specifies a match for the character "a" or "b", and includes the special symbols < >, specifying the match should be performed in parallel. This is implemented by the :branch: keyword at state 2, executing both next states 3 and 4 simultaneously. If either specified character in these states matches the input, the regex operation is accepted at state 5.

Example 9

RE="a{b|c}d"
[4]
   c→5
[3]
   b→5
[1]
   :init:
   a→2
[2]
   :backtrack:→3, 4
[5]
   d→6
[6]
   :accept:

Example 9 specifies a match for the character "a", followed by either "b" or "c", then the character "d". The symbols { } indicate that matches of "b" and "c" should be done sequentially. The character "a" is first matched at state 1. The sequential match for "b" and "c" is then launched by the :backtrack: keyword at state 2. States 3 and 4 are then launched sequentially, matching characters "b" and "c", respectively. In particular, if the character match at state 3 fails, state 4 is executed for a potential match. However, if state 3 matches, then state 4 is never executed. If either of these is successful, control passes to state 5, where the character "d" is matched. If this is also successful, then the regex operation is accepted at state 6.

Example 10

RE="(<a|b>)"
[5]
   b→6
[4]
   a→6
[2]
   :any:→3
[3]
   :branch:→4, 5
[6]
   :any:→7
[1]
   :init:
   :any:→2
[7]
   :accept:

Example 10 specifies a match for the character "a" or "b". The < > symbols indicate a parallel match, and the ( ) symbols group the regex as a sub-expression. The ( ) symbols cause the insertion of :any: transitions at states 2 and 6. The < > symbols are implemented by the :branch: keyword at state 3, branching execution simultaneously to next states 4 and 5. If either of these matches, control flows (through state 6) to be accepted at state 7.

Example 11

RE="<a|(<b|c>)>"
[8]
   c→9
[7]
   b→9
[5]
   :any:→6
[6]
   :branch:→7, 8
[9]
   :any:→10
[4]
   :any:→5
[10]
   :any:→11
[3]
   a→11
[1]
   :init:
   :any:→2
[2]
   :branch:→3, 4
[11]
   :accept:

Example 9 specifies a match for the character "a" or either character "b" or "c". Due to the outer < > symbols, the matches for "a" and "b or c" are to be performed in parallel. Additionally, due to the inner < > symbols, the matches for "b" and "c" are to be performed in parallel. Furthermore, the "b or c" match is grouped by ( ) symbols as a sub-expression. Execution begins at state 1, and first forks at state 2 to execute new states 3 and 4 simultaneously. State 3 matches the character "a", and accepts at state 11. State 4 directs control to state 5, which directs control to state 6 where a second branch statement forks the matching of characters "b" and "c" simultaneously, at states 7 and 8, respectively. A match at either directs control in succession to states 9, 10, and 11, where the regex is accepted.

It is apparent that many of the preceding regex graphs include numerous state transitions that appear redundant—that is, they do not directly match any characters. This is the case in many embodiments when (referring to FIG. 1) a regular expression 12 is compiled into a transition table 14 by a compiler or other transformation that does not perform optimizations "on the fly." As indicated in FIG. 1, the transition table 14 may be optimized to generate an optimized transition table 18. Three types of optimization are considered: state compression, token compression, and branch reduction.

Consider an example RE="(ab)", for which the graph is:
RE="(ab)"
[2]
   a→3
[3]
   b→4
[1]
   :init:
   :any:→2
[4]
   :accept:

In this case, the regex specifies a match of the character string "ab". The ( ) symbols group off a sub-expression, and will result in state transitions using the :any: keyword. Initially at state 1, control flows to state 2. The input character must match "a" in state 2 and "b" in state 3 to advance to state 4, where the regular expression is accepted.

The goal of state compression is to eliminate empty transitions. For example, in this example graph, the transition from state 1 does nothing but advance the state machine from one state to another state:

[1]
    :init:
    :any:→2

In general, a state transition can be eliminated if and only if no character matching occurs and the corresponding state is not referenced somewhere else in the graph. Since state 2 in this example is not referenced elsewhere, it can be removed, and the transition of state 1 can incorporate the match of state two. The state transition specification is thus rewritten as:

[1]
    :init:
    a→3

This yields the following optimized graph:
RE="(ab)"
[2]
    b→3
[1]
    :init:
    a→2
[3]
    :accept:

Note that, in this case, the result of state compression optimization is to eliminate state transitions that may arose only from grouping in the regular expression, using the ( ) symbols. Similar optimization may be performed on the regular expression (i.e., removing unnecessary grouping characters) prior to generating the graph of input-dependent state transition specifications.

The goal of token compression is to reduce the number of states and transitions for successive tokens. For example, consider the following graph, matching the string "ab" and using the parallel execution symbols:
RE="<ab>"
[3]
    a→4
[4]
    b→5
[1]
    :init:
    :any:→2
[2]
    :branch:→3
[5]
    :accept:

In this graph, the states 3 and 4 each match a single token:
[3]
    a→4
[4]
    b→5

If the state 4 is not referenced anywhere else in the graph, this can be compressed into:
[3]
    ab→5

Using state compression as described above to eliminate state 2, and token compression to eliminate state 4, yields the following graph for this example:
RE="<ab>"
[3]
    ab→5
[1]
    :init:
    :branch:→3
[5]
    :accept:

Note that the processing efficiency gained in token compression depends in part on the bandwidth of the lookup engine 24 retrieving characters from the input 30. For example, if the lookup engine 24 can only retrieve one character at a time, it will still require two cycles to retrieve both "a" and "b", and then pass the token "ab" to the regex engine 22. In general, the token compression level in transition table 18 optimization should not exceed the lookup size achievable from the input 30 by the lookup engine 24.

Branch optimization depends on the depth and length of a branch in a state transition. The exit state in a branch transition refers to the state in which the state machine will reside when the end of the branch block is reached. The depth of a branch is the number of transitions needed to reach the exit state. The length of a branch is the total number of states in the transition. Due to the complexity of automating branch length reduction, this task is best performed by inspection.

The lookup table 20 is computed from the graph of transitions in the transition table 14, 18. For each state, the state transition specification is removed and replaced by the number of characters necessary to satisfy the input condition of the state transition (i.e., what character(s) to match, if any). For example, in the last (optimized) example, the lookup table 20 would be:
[3]
    2
[1]
    0
[5]
    0

At state 1 the lookup engine 24 reads nothing, at state 3 it reads two characters from the input 30, and at state 5 it reads nothing.

Figure 4:
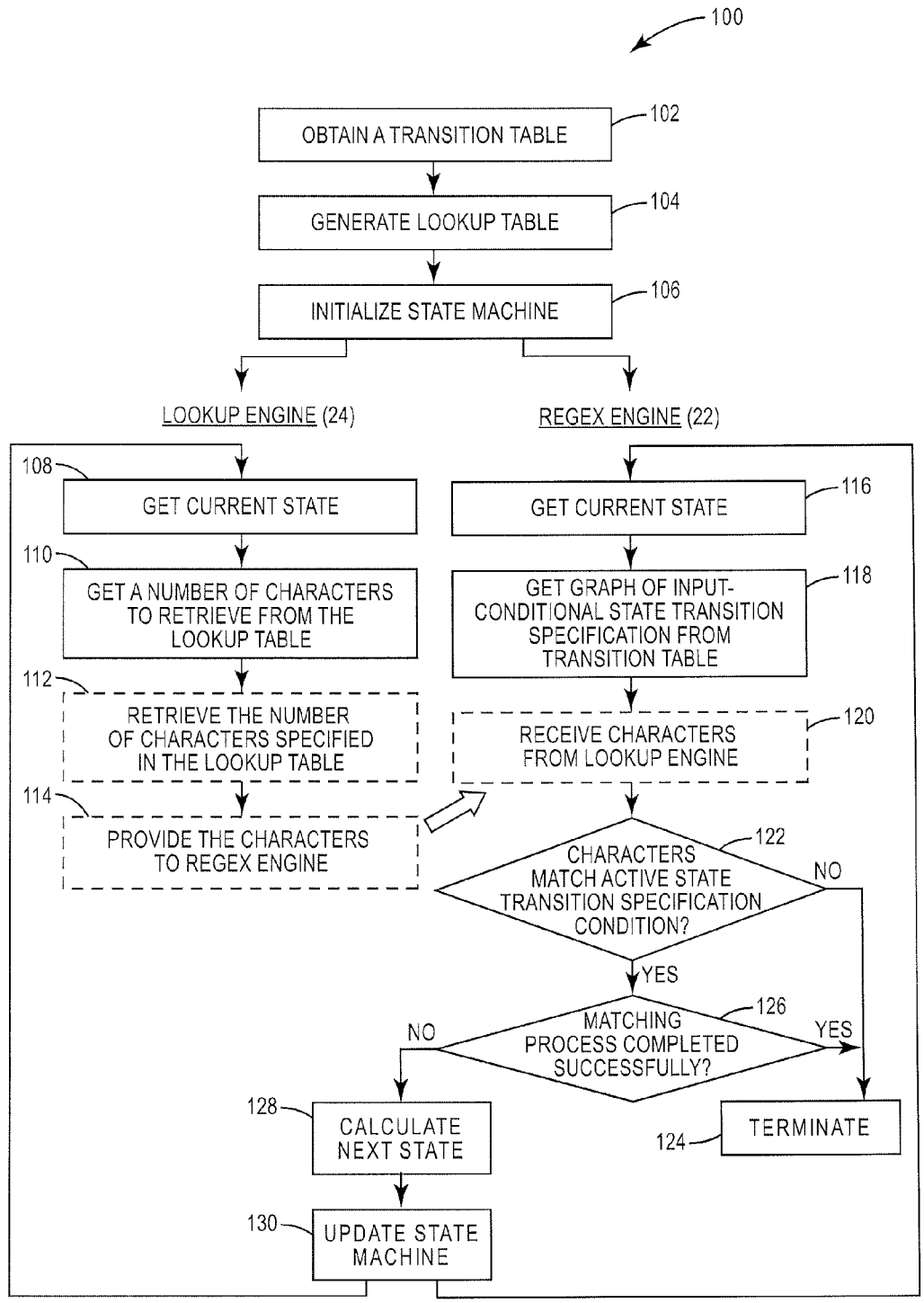
FIG. 4 is a flow diagram of a method of matching regular expressions.

FIG. 4 depicts a method 100 of matching a regular expression. For clarity of explanation, only a single regex engine 22 is assumed to be active. A transition table 14, 18 is obtained (block 102), representing the regular expression to be matched as a graph comprising a plurality of input-conditional state transition specifications. The transition table 14, 18 may be compiled from a regular expression 12, or may be obtained otherwise 16. The transition table 18 may be optimized by performing one or more of state compression, token compression, and branch optimization. A lookup table 20, specifying the number n of characters to be retrieved from an input 30 and passed to the regex engine 22 for each state, is derived from the transition table 14, 18 (block 104). A state machine associated with the regex engine 22 is initialized (block 106).

Both the regex engine 22 and the lookup table 24 then begin execution in parallel, synchronized by the current state 28 of a state machine maintained by the regex engine 22. The lookup engine 24 reads the current state 28 of the state machine (block 108), and the number n of characters to retrieve for that state from the lookup table 20 (block 110). The lookup engine 24 then retrieves the n characters from an input 30 (block 112), and provides the n characters to the regex engine 22 (block 114), such as by writing them to a token area 36 of shared memory 34. Note that not all states require character input. Accordingly, blocks 110 and 112 are indicated as optionally executed by dashed lines.

At the same time—that is, for the same current state 28 of the state machine—the regex engine 22 advances the regular expression matching process. The regex engine 22 reads the current state 28 (block 116), and reads the input-conditional state transition specifications corresponding to the current state 28 from the transition table 14, 18 (block 118). If the active state transition specification(s) include characters to match, the regex engine 22 receives the corresponding number of characters from the lookup engine 24 (block 120), if any, as indicated by dashed lines, such as by reading them from a token area 36 of shared memory 34.

If the retrieved character(s) fail to match any active state transition specification condition (block 122), the regular expression matching operation fails and the regex engine 22 terminates (block 124). If the retrieved character(s) exactly match at least one active state transition specification condition (block 122), the regex engine 22 determines whether the regular expression matching operation has completed successfully (block 126), such as by encountering the :accept: keyword. In this case, the regex engine 22 terminates the process as a success (block 124). If the input matched (block 122) and the regular expression matching process has not completed (block 126), then the regex engine 22 calculates the next state(s) of the state machine according to the active input-conditional state transition specification(s) (block 128). The regex engine 22 then updates the current state 28 of the state machine (block 130), and execution for both the regex engine 22 and the lookup engine 24 continue with the new state 28 (blocks 108, 116).

Embodiments of the present invention may be implemented in a variety of ways. Each regex engine 22 and the lookup engine may be implemented as hardwired state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. Furthermore, the regex engines 22 and/or lookup engine 24 may be implemented as software modules executing on the same or different processors or DSPs. The shared memory 34 may comprise any nontransient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like. Of course, the arrangement of each set of lookup table 20, transition table 14, 18, state 28, token 36, mutex 38, and current input position 40 in shared memory 34 is representative only and not limiting. In general, these data may be stored and transferred in a variety of ways, as those of skill in the art may readily devise for any given implementation, given the teachings of the present disclosure.

As used herein, the term "character" refers broadly to the set of alpha-numeric (text) characters that are matched in regular expressions, including symbols (e.g., grouping symbols, mathematical and logical operators, wildcard characters, and the like). In most communication systems, characters are encoded and stored in bytes of memory. For example, to match the token "abc" the lookup engine 24 would typically retrieve three bytes from the input 30. However, various character encodings are known in the art, and characters may be represented in memory sizes other than bytes. The term "characters" thus refers to the elements matched by a regular expression, regardless of their encoding or storage in memory or other medium. "Characters" includes groupings of characters, such as words, strings, and the like.

Embodiments of the present invention provide numerous advantages over the prior art. The parallel embodiments permit a plurality of regular expressions to be matched against the same input character stream 30. In many cases, optimizations improve performance by combining regular expression matching for complex expressions and fast one-shot matching for strings, rather than multiple, sequential, character-by-character state transitions. Embodiments of the present invention also provide flexibility in matching the optimization of regular expressions to specific hardware architectures and limitations (e.g., input character retrieval bandwidth). It is often difficult to know how to optimize sub-expressions of a regular expression in the abstract. By providing symbols that explicitly invoke, e.g., parallel and backtrack execution of multiple sub-expressions, a regular expression compiler can be better matched to the constraints of specific hardware implementations.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of matching a stream of characters against a predetermined regular expression, implemented using computational hardware comprising at least two hardware engines, the at least two hardware engines comprising a lookup engine and a regex engine, the method comprising:
   obtaining a transition table representing the regular expression as a graph comprising one or more input-conditional state transition specifications not limited to single-character inputs;
   generating a lookup table based on the transition table, the lookup table containing exactly one entry for each state of a state machine, each entry specifying a number n of characters to obtain from the character stream, wherein n is a non-negative integer not limited to 0 or 1;
   initializing the state machine;
   executing the lookup engine operative to, at each state of the state machine, retrieve the n characters specified in the lookup table for that state, and provide the n characters to the regex engine; and
   executing the regex engine operative to, at each state of the state machine, perform one of:
      calculating a next state of the state machine based on the current state, the n characters received from the lookup engine, and the graph of state transition specifications; and
      terminating the method if all characters received from the lookup engine fail to match input conditions for all active state transition specifications or if a match succeeds.

2. The method of claim 1 wherein obtaining a transition table comprises compiling a regular expression into a graph comprising a plurality of input-conditional state transition specifications not limited to single-character inputs.

3. The method of claim 1 further comprising optimizing the transition table by eliminating any state transition specifications, not referenced elsewhere within the graph, that are not conditional on an input and operate only to advance the state machine.

4. The method of claim 1 further comprising optimizing the transition table by combining two or more sequential input-conditional state transition specifications into one state transition specification dependent on a combined input, if the input-conditional state transition specifications prior to the last one are not referenced elsewhere within the graph.

5. The method of claim 1 wherein the regular expression syntax differentiates between:
  parallel evaluation of two or more sub-expressions, wherein the state machine forks and the regex engine evaluates characters from the character stream against the sub-expressions in parallel; and
  backtracking evaluation of two or more sub-expressions, wherein the regex engine evaluates characters from the character stream against the sub-expressions sequentially.

6. The method of claim 1, further comprising evaluating a plurality of regular expressions, by:
  obtaining a plurality of transition tables, each representing a regular expression;
  generating a plurality of lookup tables based on the plurality of transition tables;
  initializing a plurality of state machines;
  executing a lookup engine operative to retrieve characters as specified in each lookup table, and provide the characters to the associated regex engine; and
  executing a plurality of regex engines, each operative to advance an associated state machine based on input from an associated transition table.

7. The method of claim 6 wherein the lookup engine is operative to provide characters to each regex engine in response to the lookup table associated with that regex engine.

8. The method of claim 6 wherein the lookup engine is operative to, for each iteration of character retrieval, select one of a plurality of active regex engines, and is further operative to disable all non-selected regex engines.

9. A regular expression matching apparatus, comprising:
  an input operative to provide characters to be matched to a regular expression in groups of zero, one, and multiple characters;
  memory operative to store:
    a first lookup table containing exactly one entry for each state of a state machine, each entry specifying a number n of characters to retrieve from the input, wherein n is a non-negative integer not limited to 0 or 1; and
    a first transition table representing a first regular expression as a graph comprising a plurality of input-conditional state transition specifications for the first state machine, wherein the input-conditional state transition specifications are not limited to zero- or single-character inputs;
  computational hardware comprising at least two hardware engines, the at least two hardware engines comprising:
    a lookup engine operative to, at each step of the first state machine, retrieve the n characters specified in the first lookup table from the input and provide the n characters to a first regex engine; and
    a first regex engine operative to, at each state of the first state machine, perform one of:
      calculating a next state of the first state machine based on its current state, any characters received from the lookup engine, and the graph of input-conditional state transition specifications; and
      terminating the matching process if all characters received from the lookup engine fail to match input conditions for all active state transition specifications or if a match succeeds.

10. The apparatus of claim 9 wherein the memory is further operative to store:
  a second lookup table specifying a variable number n of characters to retrieve from the input at each state of a second state machine; and
  a second transition table representing a second regular expression as a graph comprising a plurality of input-conditional state transition specifications for the second state machine, wherein the input-conditional state transition specifications are not limited to zero- or single-character inputs;
  wherein the lookup engine is further operative to, at each step of the second state machine, retrieve the n characters specified in the second lookup table from the input and provide the n characters to a second regex engine; and
  further comprising a second regex engine operative to, at each state of the second state machine, perform one of:
    calculating a next state of the second state machine based on its current state, any characters received from the lookup engine, and the graph of input-conditional state transition specifications; and
    terminating the matching process if all characters received from the lookup engine fail to match input conditions for all active state transition specifications or if a match succeeds.

11. The apparatus of claim 10 wherein the lookup engine is further operative to arbitrate among the first and second regex engines that are active;
  select one of the first or second regex engines;
  enable the selected regex engine; and
  perform character lookup in response to the corresponding lookup table and the current state of the corresponding state machine.

12. The apparatus of claim 11 wherein the lookup engine is further operative to suspend the matching process of the non-selected first or second regex engine while retrieving characters for the selected first or second regex engine.

13. The apparatus of claim 12 wherein the lookup engine is operative to suspend the matching process of the non-selected first or second regex engine by employing a mutual exclusion (mutex) mechanism.

* * * * *